US012688243B2

(12) United States Patent (10) Patent No.: US 12,688,243 B2
Yamashita et al. (45) Date of Patent: Jul. 21, 2026

(54) INFORMATION PROCESSING SYSTEM

(71) Applicant: TOYOTA JIDOSHA KABUSHIKI KAISHA, Toyota (JP)

(72) Inventors: Hiroyasu Yamashita, Toyota (JP); Kazuya Matsumoto, Nagoya (JP); Harufumi Muto, Miyoshi (JP); Yosuke Ueno, Nagoya (JP); Yusuke Matsumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/183,077

(22) Filed: Apr. 18, 2025

(65) Prior Publication Data

US 2026/0064779 A1 Mar. 5, 2026

(30) Foreign Application Priority Data

Aug. 29, 2024 (JP) ................................. 2024-147901

(51) Int. Cl.
*G06F 16/00* (2019.01)
*G06F 16/906* (2019.01)
*G06F 16/93* (2019.01)

(52) U.S. Cl.
CPC ............ *G06F 16/93* (2019.01); *G06F 16/906* (2019.01)

(58) Field of Classification Search
CPC ............................... G06F 16/93; G06F 16/906
See application file for complete search history.

(56) References Cited

U.S. PATENT DOCUMENTS

2016/0154860 A1* 6/2016 Bender ................. G06F 16/248
707/754
2016/0217202 A1* 7/2016 Klahre .................. G06F 16/282

FOREIGN PATENT DOCUMENTS

JP 2002-351727 A 12/2002

* cited by examiner

*Primary Examiner* — Dinku W Gebresenbet
(74) *Attorney, Agent, or Firm* — SoraIP, Inc.

(57) ABSTRACT

An information processing system includes a processing unit for grouping a first hierarchical document and a second hierarchical document referred to by at least one document included in the first hierarchical document to generate a document group, and concurrently confirming states of all the hierarchical documents after at least one of the hierarchical documents included in the document group is updated.

2 Claims, 3 Drawing Sheets

| DOCUMENT TITLE | CHAPTER NUMBER | DOCUMENT |
|---|---|---|
| RULE A | 1 | DEFINITION |
| | 2 | SPECIFICATION    A INCLUDES ○○ |
| | 3 | TEST    A SATISFIES CHAPTER 2 OF RULE B |
| | ... | ... |
| RULE B | 1 | MEASUREMENT CONDITION |
| | 2 | MEASUREMENT METHOD    IN CASE OF ○○ |
| | 3 | MEASUREMENT METHOD    IN CASE OF □□ |
| | ... | ... |
| RULE C | 1 | □□TEST    CHAPTER 3 OF RULE B IS SATISFIED |
| | | |

| REFERENCE SOURCE | REFERENCE DESTINATION | STATE | MODIFICATION |
|---|---|---|---|
| RULE A-3 | RULE B-2 | | |
| ... | ... | ... | ... |

| REFERENCE SOURCE | REFERENCE DESTINATION | STATE | MODIFICATION |
|---|---|---|---|
| RULE A-3 | RULE B-2 | LOCK | |
| RULE A'-3 | RULE B'-2 | DUPLICATE | |
| ... | ... | ... | ... |

| REFERENCE SOURCE | REFERENCE DESTINATION | STATE | MODIFICATION |
|---|---|---|---|
| RULE A-3 | RULE B-2 | LOCK | |
| RULE A'-3 | RULE B'-2 | DUPLICATE | |
| RULE C'-1 | RULE B'-3 | DUPLICATE | |
| ... | ... | ... | ... |

| REFERENCE SOURCE | REFERENCE DESTINATION | STATE | MODIFICATION |
|---|---|---|---|
| RULE A-3 | RULE B-2 | LOCK | |
| RULE A'-3 | RULE B'-3 | DUPLICATE | COMPLETED |
| RULE C'-1 | RULE B'-2 | DUPLICATE | COMPLETED |
| ... | ... | ... | ... |

| MODIFICATION GROUP | DOCUMENT TITLE | MODIFICATION |
|---|---|---|
| GROUP 1 | RULE A', RULE B' | |

| MODIFICATION GROUP | DOCUMENT TITLE | MODIFICATION |
|---|---|---|
| GROUP 1 | RULE A', RULE B', RULE C' | |

| MODIFICATION GROUP | DOCUMENT TITLE | MODIFICATION |
|---|---|---|
| GROUP 1 | RULE A', RULE B', RULE C' | COMPLETED |

FIG. 5

INFORMATION PROCESSING SYSTEM

CROSS-REFERENCE TO RELATED APPLICATION

This application claims priority to Japanese Patent Application No. 2024-147901 filed on Aug. 29, 2024. The disclosure of the above-identified application, including the specification, drawings, and claims, is incorporated by reference herein in its entirety.

BACKGROUND

1. Technical Field

The present disclosure relates to a technical field of an information processing system that performs processing on a structured document.

2. Description of Related Art

As an example of such a system, a system for verifying consistency between a data section and an index section included in a database has been proposed (see Japanese Unexamined Patent Application Publication No. 2002-351727 (JP 2002-351727 A)). In the system, during the update of the data section and the index section, the consistency between the data section and the index section is verified based on whether the counter in the data section and the counter in the index section have the same value.

SUMMARY

In a structured document, one document (in other words, one piece of data) may refer to another document (in other words, another piece of data). In this case, there is a technical issue in that it is difficult to modify the one document and the other document in parallel while ensuring consistency between the one document and the other document. The above issue is not described in JP 2002-351727 A.

The present disclosure has been made in view of the issue described above, and an object of the present disclosure is to provide an information processing system capable of ensuring consistency between a plurality of documents when the documents are modified in parallel.

An information processing system according to an aspect of the present disclosure includes a processing unit configured to group a first hierarchical document and a second hierarchical document referred to by at least one document included in the first hierarchical document to generate a document group, and after at least one of a plurality of hierarchical documents included in the document group is updated, concurrently confirm states of all the hierarchical documents.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a diagram showing an example of the reference information;

FIG. 3B is a diagram showing an example of the reference information;

FIG. 3C is a diagram showing an example of the reference information;

FIG. 3D is a diagram showing an example of the reference information;

FIG. 4A is a diagram showing an example of the modification group information;

FIG. 4B is a diagram showing an example of the modification group information;

FIG. 4C is a diagram showing an example of the modification group information; and FIG. 5 is a diagram showing an example of a structured document after modification.

DETAILED DESCRIPTION OF EMBODIMENTS

Figures 1, 2:
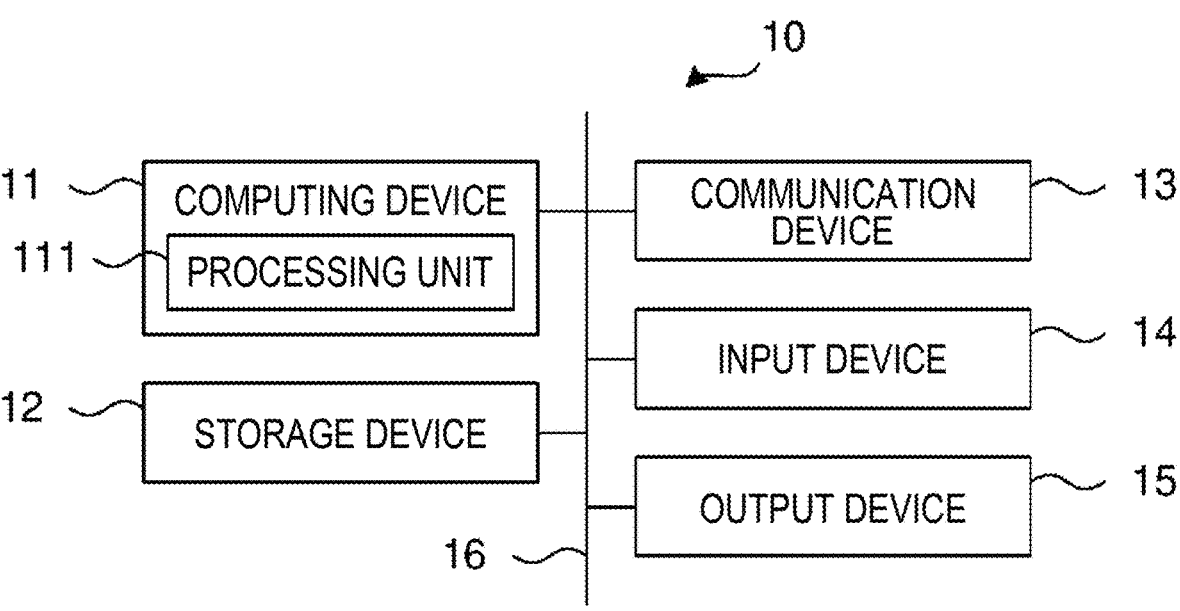
FIG. 1 is a diagram showing an example of a configuration of an information processing system according to an embodiment.
FIG. 2 is a conceptual diagram showing an example of a structured document.

An embodiment relating to an information processing system will be described with reference to FIGS. 1 to 4C.

Configuration of System

The configuration of an information processing system will be described with reference to FIG. 1. In FIG. 1, the information processing system 10 includes a computing device 11, a storage device 12, a communication device 13, an input device 14, and an output device 15. The computing device 11, the storage device 12, the communication device 13, the input device 14, and the output device 15 may be connected via a data bus 16. The computing device 11, the storage device 12, the communication device 13, the input device 14, and the output device 15 may be connected via a network instead of the data bus 16.

The computing device 11 may have one or more processors. The processor may be, for example, at least one of a central processing unit (CPU) and a graphics processing unit (GPU).

The storage device 12 may have one or more memories. The memory may be, for example, at least one of a random access memory (RAM), a read only memory (ROM), a hard disk device, an optical disk device, a solid state drive (SSD), and an optical disk array.

The communication device 13 may be communicable with a device outside the information processing system 10. The communication device 13 may perform wired communication or may perform wireless communication.

The input device 14 is a device that can receive input of information to the information processing system 10 from the outside. The input device 14 may include an operation device (for example, a keyboard, a mouse, or a touch panel) that can be operated by a user of the information processing system 10. The input device 14 may include a recording medium reading device that can read information recorded on a recording medium that is detachable from the information processing system 10, such as a universal serial bus (USB) memory. In a case where information is input to the information processing system 10 via the communication device 13 (in other words, in a case where the information processing system 10 acquires information via the communication device 13), the communication device 13 may function as an input device.

The output device 15 is a device that can output information to the outside of the information processing system 10. The output device 15 may output visual information, such as characters or images, as the information, may output auditory information, such as sound, as the information, or may output tactile information, such as vibration, as the information. The output device 15 may include, for example, at least one of a display, a speaker, a printer, and a vibration motor. The output device 15 may output information to a recording medium that is detachable from the information processing system 10, such as a USB memory. In a case where the information processing system 10 outputs the information via the communication device 13, the communication device 13 may function as an output device.

The storage device 12 can store desired data. The memory of the storage device 12 may store a computer program executed by the computing device 11. The storage device 12 may temporarily store data temporarily used by the computing device 11 when the computing device 11 executes the computer program. For example, the computing device 11 may realize a logical functional block for executing the processing to be executed by the information processing system 10 in the computing device 11 by executing the computer program. In the present embodiment, the processing unit 111 may be realized in the computing device 11 by the computing device 11 executing the computer program.

Structured Document

An example of a structured document will be described with reference to FIG. 2. The structured document may mean a plurality of documents having a hierarchical relationship. In the present embodiment, a structured document 100 is given as an example of a structured document. The structured document 100 may be stored in the storage device 12. In this case, a database including the structured document 100 may be built in the storage device 12. Examples of the structured document include a legal document, a technical document, and a manual.

The structured document 100 includes a rule A, a rule B, and a rule C. The rule A includes chapters 1, 2, and 3. The rule B includes chapters 1, 2, and 3. The rule C includes chapter 1. Here, the "rule A", the "rule B", and the "rule C" may be the highest hierarchy. The "chapter 1", "chapter 2", and "chapter 3" included in the rule A are subordinate hierarchies of the "rule A". The "chapter 1", "chapter 2", and "chapter 3" included in the rule B are subordinate hierarchies of the "rule B". The "chapter 1" included in the rule C is a lower hierarchy of the rule C.

In the information processing system 10, the structured document 100 may be divided and managed for each rule. In this case, the rule A, the rule B, and the rule C may be treated as different data, respectively. That is, three pieces of data corresponding to the rule A, the rule B, and the rule C may be present. Since the rules A, B, and C have a hierarchical structure, each of the rules A, B, and C is also a structured document. The structured document 100 may be divided and managed for each chapter.

Operation of System

An operation of the information processing system 10 will be described. In the present embodiment, the operation of the information processing system 10 in a case where the structured document 100 is updated will be described.

When the structured document 100 is updated, the processing unit 111 of the information processing system 10 generates a duplicate of the rule including the document to be updated in the structured document 100. For example, when the document included in the rule A is the update target, the processing unit 111 generates a duplicate of the data corresponding to the rule A. For example, the user of the information processing system 10 edits (for example, modifies) the duplicate of the data corresponding to the rule A. After the user confirms the editing of the rule A, the processing unit 111 replaces the data corresponding to the rule A to which the editing has been performed (that is, the duplicate) with the original data corresponding to the rule A. As a result, the structured document 100 is updated.

For example, one structured document may refer to another structured document. For example, in the chapter 3 of the rule A, "the test A satisfies the chapter 2 of the rule B" is described. That is, the chapter 3 of the rule A refers to the chapter 2 of the rule B. Similarly, in the chapter 1 of the rule C, "the □□ test satisfies the chapter 3 of the rule B" is described. That is, the chapter 1 of the rule C refers to the chapter 3 of the rule B.

For example, the one structured document and the other structured document may be updated in a state where the one structured document refers to the other structured document. In this case, with the update method for each of the one structured document and the other structured document, the one structured document and the other structured document may not be consistent. Therefore, in the information processing system 10, the consistency between the structured documents is ensured by the operation described below.

The storage device 12 of the information processing system 10 may store reference information 200 (see FIG. 3A) including information indicating that the chapter 3 of the rule A refers to the chapter 2 of the rule B. The reference information 200 may be generated by the user of the information processing system 10 or may be automatically generated by the information processing system 10.

When the input unit 14 receives a user's input to start the modification of the rule A and the rule B, the processing unit 111 generates a rule A' that is a duplicate of the rule A and a rule B' that is a duplicate of the rule B. The rule A' that is a duplicate of the rule A is a duplicate of the data corresponding to the rule A. The rule B' that is a duplicate of the rule B is a duplicate of the data corresponding to the rule B. At this time, the processing unit 111 adds information indicating that the chapter 3 of the rule A' refers to the chapter 2 of the rule B' to the reference information 200. As a result, the reference information 200a shown in FIG. 3B may be generated. In the reference information 200a, the state "lock" may indicate that the rule A and the rule B are in an unmodifiable state. As described above, in a case where the user modifies the rule A and the rule B, it is possible to prevent another user different from the user from modifying the rule A and the rule B.

The processing unit 111 may further group the rule A' and the rule B' based on the reference information 200a to generate the group 1. The processing unit 111 registers the information on the group 1 in the modification group information. As a result, the modification group information 300 shown in FIG. 4A may be generated. The modification group information 300 may be stored in the storage device 12.

Here, the user can add a new structured document to the group 1 via the input device 14. That is, the group 1 is changeable.

As described above, the chapter 1 of the rule C refers to the chapter 3 of the rule B. For example, the user may modify the rule C in addition to the rule A and the rule B. When the input unit 14 receives a user's input to start the modification of the rule C, the processing unit 111 generates the rule C' (that is, a duplicate of the rule C, that is, a duplicate of the data corresponding to the rule C). The processing unit 111 further adds information indicating that the chapter 1 of the rule C' refers to the chapter 3 of the rule B' to the reference information 200a. As a result, the reference information 200b shown in FIG. 3C may be generated. The processing unit 111 further adds the rule C' to the group 1. As a result, the modification group information 300a shown in FIG. 4B may be generated.

Thereafter, for example, as shown in FIG. 5, the user may modify the rule B' by exchanging the chapter 2 and chapter 3 of the rule B'. The user may modify the chapter 3 of the rule A' to "the test A satisfies the chapter 3 of the rule B" in association with the modification of the rule B'. The user may modify the chapter 1 of the rule C' to "the □□ test satisfies the chapter 2 of the rule B" in association with the modification of the rule B'.

Thereafter, the user may input the indication that the modification is completed via the input device 14. When the input device 14 receives the user's input indicating that the modification is completed, the processing unit 111 may register information indicating that the modification is completed in the modification column of the structured document 400. In the present embodiment, the completion of the modification means that the modification of all the structured documents (for example, the rule A', the rule B', and the rule C') included in one group (for example, the group 1) is completed. For example, in a case where the input device 14 receives the user's input indicating that the modification is completed, the user cannot modify the rules A', B', and C'. Therefore, in the present embodiment, all the modifications of the structured documents included in one group are concurrently confirmed.

The processing unit 111 further adds information indicating that the chapter 3 of the rule A' refers to the chapter 3 of the rule B' and information indicating that the modification is completed to the reference information 300a. The processing unit 111 further adds information indicating that the chapter 1 of the rule C' refers to the chapter 2 of the rule B' and information indicating that the modification is completed to the reference information 200b. As a result, the reference information 200c shown in FIG. 3D may be generated. The processing unit 111 further adds that the modification is completed to the modification group information 200b. As a result, the modification group information 300b shown in FIG. 4C may be generated.

Thereafter, the processing unit 111 releases the lock state of the rules A, B, C, which are the originals of the rules A', B', C' belonging to the group 1. Then, the processing unit 111 replaces the rules A', B', and C' with the rules A, B, and C, respectively. As a result, the rule A' becomes a new rule A. Similarly, the rule B' becomes a new rule B, and the rule C' becomes a new rule C.

In the above-described embodiment, the chapter 1 of the additional rule C' in the group 1 is modified. However, the rule C' (in other words, the new structured document) may not be added to the group 1. In this case, after the modification of the rule A' and the rule B' is confirmed, the rule A' and the rule B' may be replaced with the rule A and the rule B, respectively. Thereafter, a new group including the rule B' and the rule C' may be generated to modify the chapter 1 of the rule C.

Technical Effect

In the information processing system 10, as described above, all the modifications of the structured documents included in one group are concurrently confirmed. Therefore, with the information processing system 10, even in a case where the structured documents are modified, the consistency between the structured documents can be ensured. That is, with the information processing system 10, it is possible to ensure the consistency of the documents when the documents are modified in parallel.

The aspects of the disclosure derived from the embodiments described above will be described below.

An information processing system according to an aspect of the disclosure includes the following processing unit. The processing unit is configured to group a first hierarchical document and a second hierarchical document referred to by at least one document included in the first hierarchical document to generate a document group. The processing unit is configured to concurrently confirm states of all the hierarchical documents after at least one of the hierarchical documents included in the document group is updated.

In the above-described embodiment, the "processing unit 111" corresponds to an example of the "processing unit", the "rule A" corresponds to an example of the "first hierarchical document", the "rule B" corresponds to an example of the "second hierarchical document", and the "rule C" corresponds to an example of the "third hierarchical document".

In the information processing system, the processing unit may be configured to add a third hierarchical document including a document referring to at least one of the first hierarchical document and the second hierarchical document to the document group.

The information processing system may include a reception unit for receiving a user's input. In the information processing system, the processing unit may add the third hierarchical document to the document group in a case where the reception unit receives the user's input to add the third hierarchical document to the document group. In the above-described embodiment, the "input device 14" corresponds to an example of the "reception unit".

The present disclosure is not limited to the above-described embodiments. The present disclosure can be appropriately modified within the technical scope of the present disclosure that can be read from the entire content of the claims and the specification, and an information processing system with such a modification is also included in the technical scope of the present disclosure.

What is claimed is:

1. An information processing system comprising a processor; and a memory storing executable instructions that cause the processor to receive a first input from a user to modify a first hierarchical document and a second hierarchical document that is referred to by at least one document included in the first hierarchical document;

generate a duplicate first hierarchical document of the first hierarchical document and a duplicate second hierarchical document of the second hierarchical document in response to receiving the first input, wherein the duplicate first hierarchical document includes data corresponding to the first hierarchical document, and the duplicate second hierarchical document includes data corresponding to the second hierarchical document;

lock the first hierarchical document and the second hierarchical document to prohibit modification of the first hierarchical document and the second hierarchical document;

update reference information indicating reference source information and reference destination information that respectively indicate reference sources and reference destinations in each of the first hierarchical document and the second hierarchical document, the reference information being stored in the memory;

generate document group information indicating that the duplicate first hierarchical document is grouped with the duplicate second hierarchical document based on the reference information;

modify the duplicate first hierarchical document and the duplicate second hierarchical document based on the received input from the user;

update the reference source information and the reference destination information of the reference information in accordance with the modifications made to the duplicate first hierarchical document and the duplicate second hierarchical document;

register modification completed information in the document group information in response to receiving a second input from the user indicating that modification of the duplicate first hierarchical document and the duplicate second hierarchical document is completed; and unlock the first hierarchical document and the second hierarchical document to overwrite the first hierarchical document and the second hierarchical document with the modified duplicate first hierarchical document and the modified duplicate second hierarchical document.

2. The information processing system according to claim 1, wherein the processor is further configured to in response to receiving the first input from the user to modify a third hierarchical document that is referred to by at least one document included in the first hierarchical document or the second hierarchical document;

generate a duplicate third hierarchical document of the third hierarchical document, the duplicate third hierarchical document including data corresponding to the third hierarchical document;

update the reference information to include the reference source information and the reference destination information that indicates the respective reference sources and the respective reference destinations in each of the first hierarchical document, the second hierarchical document, and the third hierarchical document; and add the third hierarchical document to the document group information to indicate that the duplicate third hierarchical document is grouped with the duplicate first hierarchical document and the duplicate second hierarchical document, wherein the reference source information and the reference destination information of the reference information is updated in accordance with the modifications made to the duplicate first hierarchical document, the duplicate second hierarchical document, and the duplicate third hierarchical document, the modification completed information is registered in the document group information in response to receiving a second input from the user indicating that modification of the duplicate first hierarchical document, the duplicate second hierarchical document, and the duplicate third hierarchical document is completed, and the first hierarchical document and the second hierarchical document are overwritten with the modified duplicate first hierarchical document, the modified duplicate second hierarchical document, and unlock the modified third hierarchical document.

* * * * *